(12) United States Patent
Blais et al.

(10) Patent No.: US 6,855,256 B2
(45) Date of Patent: Feb. 15, 2005

(54) HYBRID CHEMICAL AND BIOLOGICAL PROCESS FOR DECONTAMINATING SLUDGE FROM MUNICIPAL SEWAGE

(75) Inventors: Jean-Francois Blais, Beauport (CA); Nathalie Meunier, Beauport (CA); Jean-Louis Sasseville, Cap-Rouge (CA); Rajeshwar D. Tyagi, Sainte-Foy (CA); Guy Mercier, Quebec (CA); Fatima Hammy, Casablanca (MA)

(73) Assignee: Institut National de la Recherche, Quebec (CA)

( * ) Notice: Subject to any disclaimer, the term of this patent is extended or adjusted under 35 U.S.C. 154(b) by 182 days.

(21) Appl. No.: 10/060,277

(22) Filed: Feb. 1, 2002

(65) Prior Publication Data

US 2002/0153307 A1 Oct. 24, 2002

Related U.S. Application Data

(63) Continuation of application No. PCT/CA00/00884, filed on Jul. 27, 2000.

(30) Foreign Application Priority Data

Aug. 3, 1999 (CA) .............................................. 2279525

(51) Int. Cl.$^7$ ................................................. C02F 3/00
(52) U.S. Cl. ....................... 210/620; 210/631; 210/702; 210/760; 210/759; 210/758; 210/754
(58) Field of Search ................................ 210/620, 631, 210/702, 760, 759, 758, 754

(56) References Cited

U.S. PATENT DOCUMENTS

| | | | |
|---|---|---|---|
| 4,277,342 A | 7/1981 | Hayes et al. | ................. 210/609 |
| 4,370,233 A | 1/1983 | Hayes et al. | ................. 210/609 |
| 4,814,091 A | 3/1989 | Napier et al. | ................. 210/665 |
| 5,051,191 A | 9/1991 | Rasmussen et al. | ........ 210/721 |

FOREIGN PATENT DOCUMENTS

DE  198 02 238  7/1999

*Primary Examiner*—Chester T. Barry
(74) *Attorney, Agent, or Firm*—Foley & Lardner LLP

(57) ABSTRACT

The invention relates to a hybrid biological and chemical method for decontaminating sludge containing heavy metals and pathogenic microorganisms, consisting of the following steps: the sludge is mixed with an acidic leaching solution in order to acidify the sludge with a pH which is low enough to solubilize the majority of the heavy metals and to destroy most of the pathogenic microorganisms but which is also high enough to minimize the solubilization of fertilizing elements; oxidation-reduction of more than +400 mv is maintained, liquid-solid separation occurs in order to obtain a solid fraction comprising decontaminated acidic sludge and a liquid fraction comprising heavy metals which are dissolved in a leaching solution; the sludge is neutralized: and neturalized decontaminated sludge is recovered, whereby the fertilizing elements contained therein, i.e. carbon, nitrogen and phosphorus, remain substantially unchanged in relation to the initially contaminated sludge.

18 Claims, 3 Drawing Sheets

Figure 1:
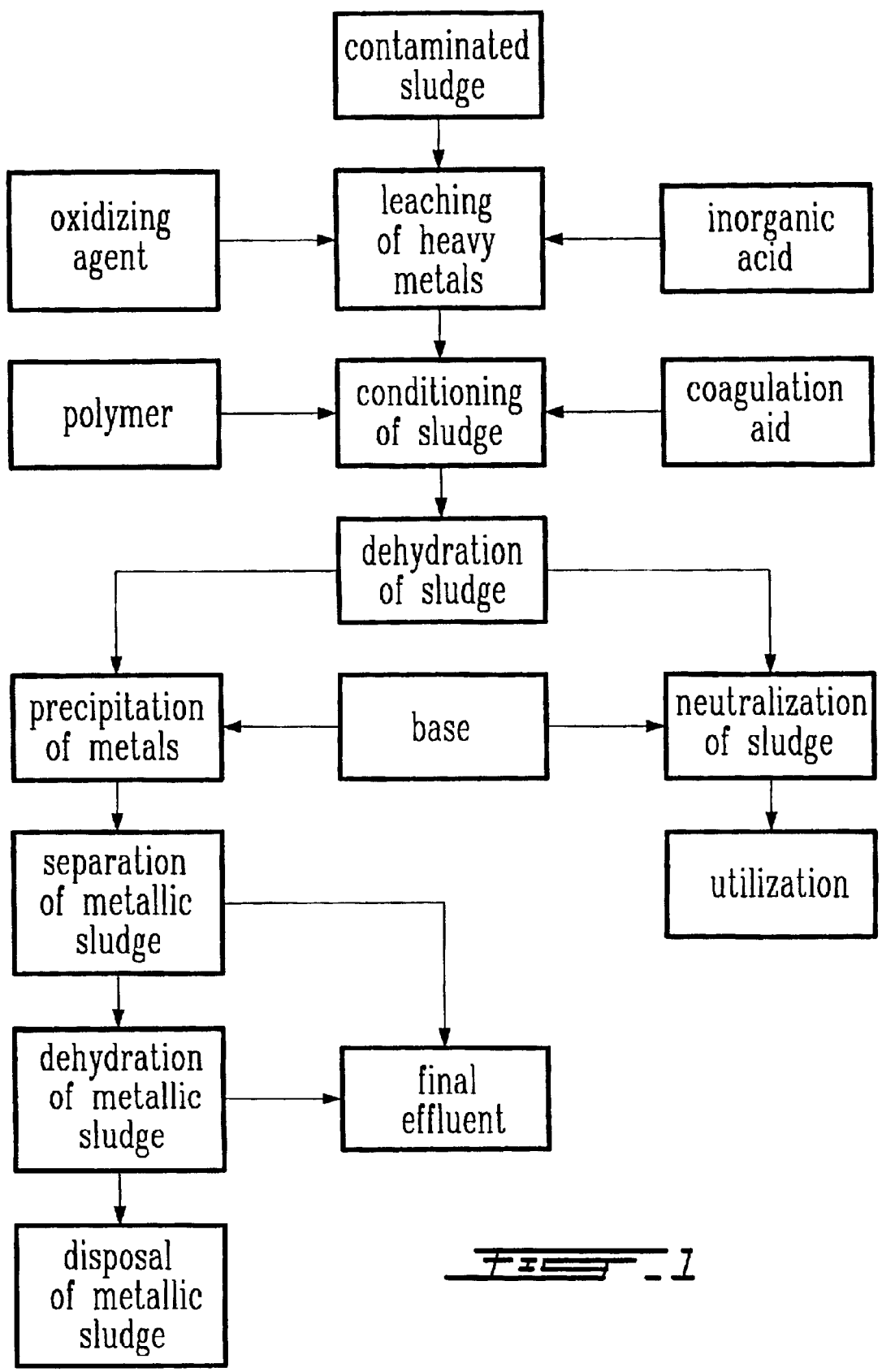

HYBRID CHEMICAL AND BIOLOGICAL PROCESS FOR DECONTAMINATING SLUDGE FROM MUNICIPAL SEWAGE

FIELD OF THE INVENTION

The present invention relates to a process for the decontamination of sewage sludge, such as sludge from municipal sewage. The technology permits considerable reduction of the content of toxic metals in the sludge and, in doing so, preserve its fertilizing properties, destroy the pathogenic germs contained in them and reduce significantly the production of odor during handling, and during or after treatment. Sludge coming from waste water that can be treated by the process of the present invention include primary, secondary type sludge, aerobically or anaerobically digested sludge, lagoons or septic tanks.

BACKGROUND ART

The annual world production of sewage sludge coming from the treatment of domestic waste water can be estimated to be near 50 million metric tons on a dry basis. The elimination methods most frequently used for the disposal of these sludges are incineration, sanitary burial and agricultural spreading. The cost of treatment and disposal of the sludges by these conventional elimination methods varies between $250.00 and $725.00 Canadian/metric ton. On this basis, the world market for the treatment of sewage sludge can be estimated at approximately 15 billion dollars annually.

Incineration and burial are the conventional methods of sludge disposal. However, increase of the volume of the sludge to be disposed of and the scarcity of dump sites as well as increasing social opposition to these methods of disposal have a tendency to favor methods of utilization, specifically, as agricultural or forest fertilizer. The agricultural utilization of sludge, the option preferred by governmental authorities, is practiced more and more all over the world. In the United States, in 1976, this method was used for the disposal of 26% of the sewage sludge produced by municipalities. In 1990, it exceeded 33% of the total volume of sludge produced. In Europe in general, approximately 37% of the sludge is used in agriculture. In the United Kingdom, more than 51% of the sludge produced is used for this purpose, while near 40% is disposed of in this way in Japan. In Canada, 29% of the total estimated volume of municipal sludge is deposited on agricultural soil.

However, the presence of pathogenic microorganisms and high concentrations of toxic metals in the sludge constitute an obstacle which significantly restricts the above practice. It is well known that conventional methods of sludge treatment, such as aerobic or anaerobic stabilization, are ineffective in removing toxic metals and not very effective in the destruction of pathogenic microorganisms. In North America and in Europe, more than 50% of the sludges produced by municipal water treatment plants according to a conventional digestion method contain concentrations of heavy metals which exceed the recommended standards for agricultural spreading, which thus makes them potentially toxic. It is well known that copper, nickel and zinc are phytotoxic and that high concentrations of these in the soil may greatly affect the harvest yield. Accumulation of metals in the plants as a result of spreading of sewage sludge was demonstrated for antimony, arsenic, cadmium, chromium, copper, iron, mercury, molybdenum, nickel, lead, selenium and zinc. Metals may also be found in the food chain by adhesion to the surface of plants, resulting from the application of sewage sludge on the soil.

The presence of heavy metals in the edible part of plants thus may prove to be a risk to human and animal health. For example, cadmium is an element particularly feared because symptoms of its phytotoxicity appear at concentrations which are near 10 times higher than that where the zootoxicity appears. In humans and in animals, excessive absorption of cadmium causes its accumulation in the kidneys and the liver, thus producing histological and functional damage. The biological effects of cadmium also include interference with fundamental enzyme systems, such as oxidative phosphorylase, by blocking of thiol groups, as well as interference with the synthesis of nucleic acids. Cadmium is also supposed to have some cardiotoxic properties. Lead is another element which has a zootoxicity potential higher than that of the phytotoxicity. Although the accumulation potential of this element in the food chain is low, toxic effects have been reported in bovines that were feeding on soil amended with sludge highly polluted with lead. Environmental exposure to low lead contents is associated with various metabolic disorders and neuropsychological deficiencies in humans, such as a damaging effect on the metabolism of red blood cells; perturbation of calcium homeostasis in hepatocytes, bone cells and brain cells; and neurological damage. Various studies also evidence the harmful effect of lead in human arterial hypertension.

Generally speaking, toxic metals such as Al, As, Sb, Be, Bi, Cd, Hg, Cr, Co, Mn, Ni, Pb, Ti, V, Se and Zn could damage human reproduction or be the initiator or promoter of certain cancers, by acting as inhibitor in the biosynthesis of DNA or RNA or even as a mutagenic agent. Results of numerous studies on the risks associated with the application of sludge containing heavy metals in agricultural soil have been published during the last few years.

The interest in reducing the toxic metal concentration in sewage sludge is a well-known fact today. Two types of intervention are envisaged in order to do this, either removal of the metals during waste water treatment and/or control at the source of industrial wastes. During the last few years, various techniques of extraction of metals have been examined, but, until now, no method was considered to be competitive on an economic level with the conventional techniques of sewage sludge disposal. Regarding reduction at the source, although desirable, this approach is not only costly, but also involves uncertain results because it is difficult to delineate the diffuse sources of pollution, which contribute to the enrichment of the sludge in toxic metals. As a matter of fact, several studies show that a large portion of the metals found in the sludge come from residences and urban surface waters.

Since 1975, several techniques have been examined for the removal of heavy metals from sewage sludge, but, so far, no economical and effective methods seem to have been installed on a commercial basis. Numerous attempts of chemical dissolution of metals have been studied, such as chlorination, ion-exchange, use of chelating agents such as ethylenediaminetetraacetic acid (EDTA) and nitrilotriacetic acid (NTA), and thermophilic self-heating aerobic digestion (TSAD), coupled with acidification with hydrochloric acid. The high operating costs, certain operational difficulties and sometimes unsatisfactory yields of metal leaching prevented the emergence of these techniques.

The addition of different organic acids ($CH_3COOH$) and inorganic acids ($H_2SO_4$, HCl, $HNO_3$) to the sludge is a technique which has been considered most frequently by various searchers. However, utilization of organic acids permits only low yields of dissolution of the metals, while involving prohibitive costs.

The use of inorganic acids alone does not permit efficient dissolution of copper and lead, in spite of a considerable acidification of the sludge, i.e., to a pH of the order of pH 1.5. The solubility of metals in the sludge is affected mainly by the pH but also by other factors which are all also important and must be taken into consideration, such as the oxidation reduction potential of the medium, the concentration of the metals and ligands, e.g., the anions and uncharged molecules, and chemical equilibrium between the constituents. The dissolution of copper and lead in the sludge requires significant increase of the oxidation reduction potential, which cannot be obtained rapidly by chemical oxidation during the aeration of the sludge. The large quantities of acid necessary to dissolve the metals make these techniques not very attractive economically.

The combined use of an acid and a strong oxidizing agent was also examined. Several searchers suggested the use of hydrochloric acid and hydrogen peroxide at a pH ranging from 1.0 to 1.5, which permits the achievement of better dissolution yields of the metals than by the addition of only an acid. However, the operating costs of this technique are high because the quantity of acid required to lower the pH to such a value is very large, without even considering that the fertilizing and nutrient elements of the sludge are then degraded or dissolved.

The method described in U.S. Pat. No. 5,051,191 comprises a very significant acidification of the sludge (pH 1.0 to 2.0), by the addition of sulfuric acid or hydrochloric acid, coupled with the addition of an oxidizing agent in the form of ferric salts (sulfate or chloride) to a concentration varying between 0.5 and 3.0 g of $Fe^{3+}$/L (sulfate or chloride) and the addition of an agent that regenerates the oxidizing agent, such as hydrogen peroxide, sodium or calcium hypochlorite, compressed air, oxygen, ozone, sulfur dioxide, chlorine or chlorinated compounds. A period of treatment of 10 to 30 minutes is sufficient with this technology for adequate dissolution of the heavy metals. The decontamination line also includes a step of conditioning the sludge by flocculation with a cationic or anionic polymer, followed by dehydration of the sludge on a drum filter under vacuum, and washing the decontaminated sludge.

The need to add considerable quantities of acid and oxidizing agent, as well as the utilization of a regenerating agent, results in operating costs which greatly restrict the marketing of this technology, even if it offers good yields of sludge decontamination. As an example, the acidification of the sludge to a pH of 1.5 requires approximately 90% more sulfuric acid than acidification of it to a pH of 2.5. Such an increase in acid consumption almost doubles the cost required for the acid and thus decreases the attractiveness of the method. The washing of the sludge during the dehydration step on a drum filter under vacuum is also an additional necessity, which involves an increase in the cost of sludge treatment.

It should also be considered that pronounced acidification of the sludge involves excessive dissolution of nutrient elements (nitrogen and phosphorus) in the sludge, which are then found inevitably in the final effluent after dehydration of the leached sludge. This phenomenon also contributes significantly to reducing the agronomic value of the sludge decontaminated in this way. For example, comparative tests on physicochemical treatment sludges from waste water showed that acidification of the sludge to a pH of 1.5 resulted in a loss of 44% of total phosphorus, while under the same experimental conditions, but at a pH of 2.5 and using the same sludge, the loss of this element is only 6%.

Another disadvantage of the method of U.S. Pat. No. 5,051,191 is the great difficulty of adequately flocculating a sludge leached at a pH below 2.0. Under these conditions of acidity, the flocks obtained by conditioning with organic polymers are of low dimension and are fragile. Dehydration of sludges flocculated in this way is very difficult with the standard equipment employed for the dehydration of sludges (filters with pressurized belts, rotary disk filters, centrifuges). As a matter of fact, the patent suggests the use of a drum filter under vacuum for the dehydration of the sludge treated by its method. Now, this type of equipment is not used for the dehydration of sewage sludges from municipal waste waters. Washing of the sludge during the dehydration step on a drum filter under vacuum, a technique which seems to be poorly adapted to the dehydration of sewage sludge, also constitutes an additional requirement, which results in an additional increase in the sludge treatment costs.

Attempts have also been made to separate metals by centrifuging. Two successive centrifuging steps permit concentration of the metals in a deposit. The concentrations of metal found in the deposit are between 60 and 73% for cadmium, nickel, chromium, copper and zinc, but this method does not permit extraction of the lead. This technique presents problems from the point of view of recovery and utilization of solids, because the sludge in which the metal contents are reduced represents only 23% of the total sludge volume.

Extraction of metals using a magnetic method and ion-exchange method was also studied. The metals in the sludge are captured by an ion-exchange resin which is regenerated subsequently in an acidic medium. The yields of removal of the metals by this technological approach in artificially contaminated sludges are 57% for copper, 66% for zinc and 86% for cadmium. However, the economical feasibility of this approach does not seem to have been demonstrated for application on an industrial scale.

A new chemical process including dissolution of metals followed by chelation on a solid support was developed for the decontamination of soils (see Mourato D. and D. D. Lang (1994) *The Toronto harbour commissioners soil recycling demonstration project, summary of operations and test results*. Final report. The Toronto harbour commissioners and Zenon Environmental inc., 46 pages). The authors of this report on the development of this process claim to have been capable of decontaminating previously digested sewage sludges. The details given in the report do not permit evaluation of the technical and economical feasibility of the application of this technology for the decontamination of sewage sludge. On the other hand, obligation to treat digested sludges decreases its applicability and certainly increases the overall cost of treatment of the sludge, making the process economically less interesting.

The utilization of organic acids in the methods of sludge treatment or of large quantities of inorganic acids necessary to lower the pH results in a significant increase in the operating costs associated with the chemical products. Thus, the high cost of these methods, the inadequateness of the equipment required for the sludge treatment stations, the insufficient yield of removal of toxic metals and the loss of fertilizing values are the main obstacles for marketing the sludge decontamination technologies which were proposed until now.

Considering the various technical and economical constraints encountered with the chemical processes of removing the metals associated with municipal sludge, interest in developing a biological extraction method appeared. During these last years, some bioleaching studies have been carried out.

A technology developed by INRS consists in a method of bioleaching of heavy metals using ferrous sulfate. The method is used for the decontamination of sewage sludge which previously underwent a microbiological stabilization step by aerobic or anaerobic digestion. The reaction time in the bioreactor varies between 1 and 2 days depending on the mode of operation and on the specific sludge to be treated. Addition of ferrous sulfate is necessary as an energy source substrate. The conditions of acidity thus created and the increase of the oxidizing conditions in the medium during the oxidation of ferrous ions to ferric ions permit significant dissolution of the toxic metals found in the sludge.

The above-mentioned biological processes permit to circumvent a good part of the problems inherent to the chemical processes, thus reducing the costs attributable to chemical products appreciably. However, the treatment times remain long (1.5 to 12 days) in comparison to the chemical processes (0.02 to 0.25 day), which result in an increase of the initial investment, such as the purchase price of the bioreactors and the cost of operation, particularly in respect of electricity.

Thus, it would be advantageous to develop a process combining the advantages of chemical and biological leaching processes, which would provide a low-cost process involving a relatively short treatment time and not requiring the purchase of expensive equipment for performing it.

SUMMARY OF THE INVENTION

The present invention concerns a hybrid chemical and biological process for the decontamination of sewage sludge containing heavy metals and pathogenic microorganisms, comprising the following steps:

mixing the sludge with an acid leaching solution to acidify the sludge to a sufficiently low pH to dissolve the majority of the heavy metals and to destroy the majority of the pathogenic microorganisms, but sufficiently high to minimize the dissolution of fertilizing elements;

maintaining an oxidation reduction potential higher than +400 mV;

effecting a solid-liquid separation to provide a solid fraction comprising decontaminated acid sludge and a liquid fraction containing the dissolved heavy metals in the leaching solution;

neutralizing the sludge; and recovering the neutralized, decontaminated sludge, in which the content of fertilizing elements, such as carbon, nitrogen and phosphorus, remained essentially unchanged in comparison to the initial contaminated sludge.

Preferably, the sludge is acidified to a pH varying from 2 to 3 and is maintained at an oxidation reduction potential higher than +400 mV. The process can be carried out using a batch, semicontinuous and continuous method.

In a particularly preferential embodiment, the leaching solution contains an inorganic acid such as sulfuric acid, hydrochloric acid and their mixtures, and an oxidizing agent. The leaching solution may also contain a precursor of the oxidizing agent, so that the oxidizing agent can be generated in situ. For example, ferrous sulfate, in the presence of bacterial flora indigenous to the sludge, is converted into ferric sulfate which acts as an oxidizing agent. This biological oxidation is carried out by a culture of *Thiobacillus ferrooxidans* present in the indigenous biomass of the sludge or by the addition of collection strains to the mixture.

IN THE DRAWINGS

Figure 2:
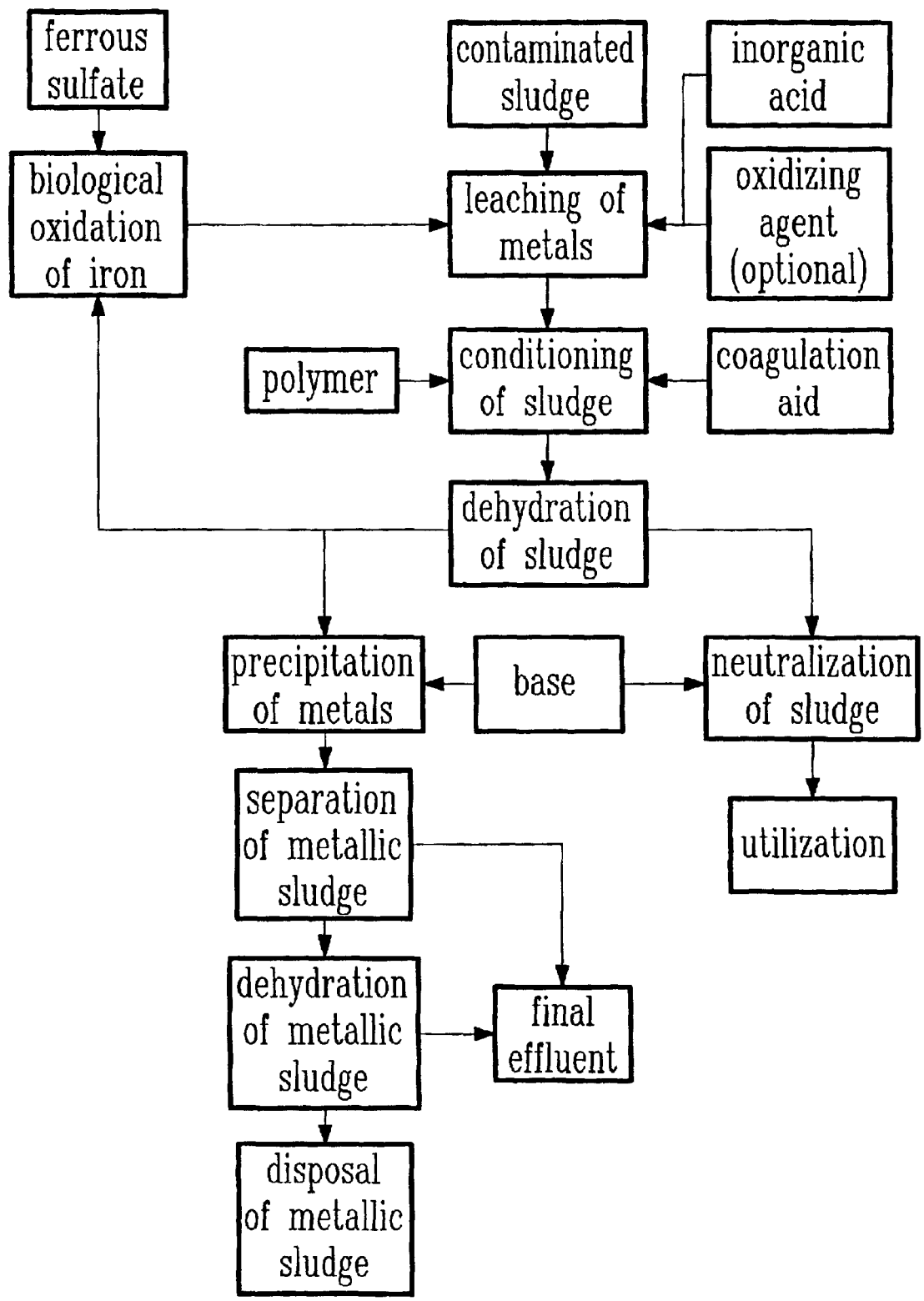
Figure 3:
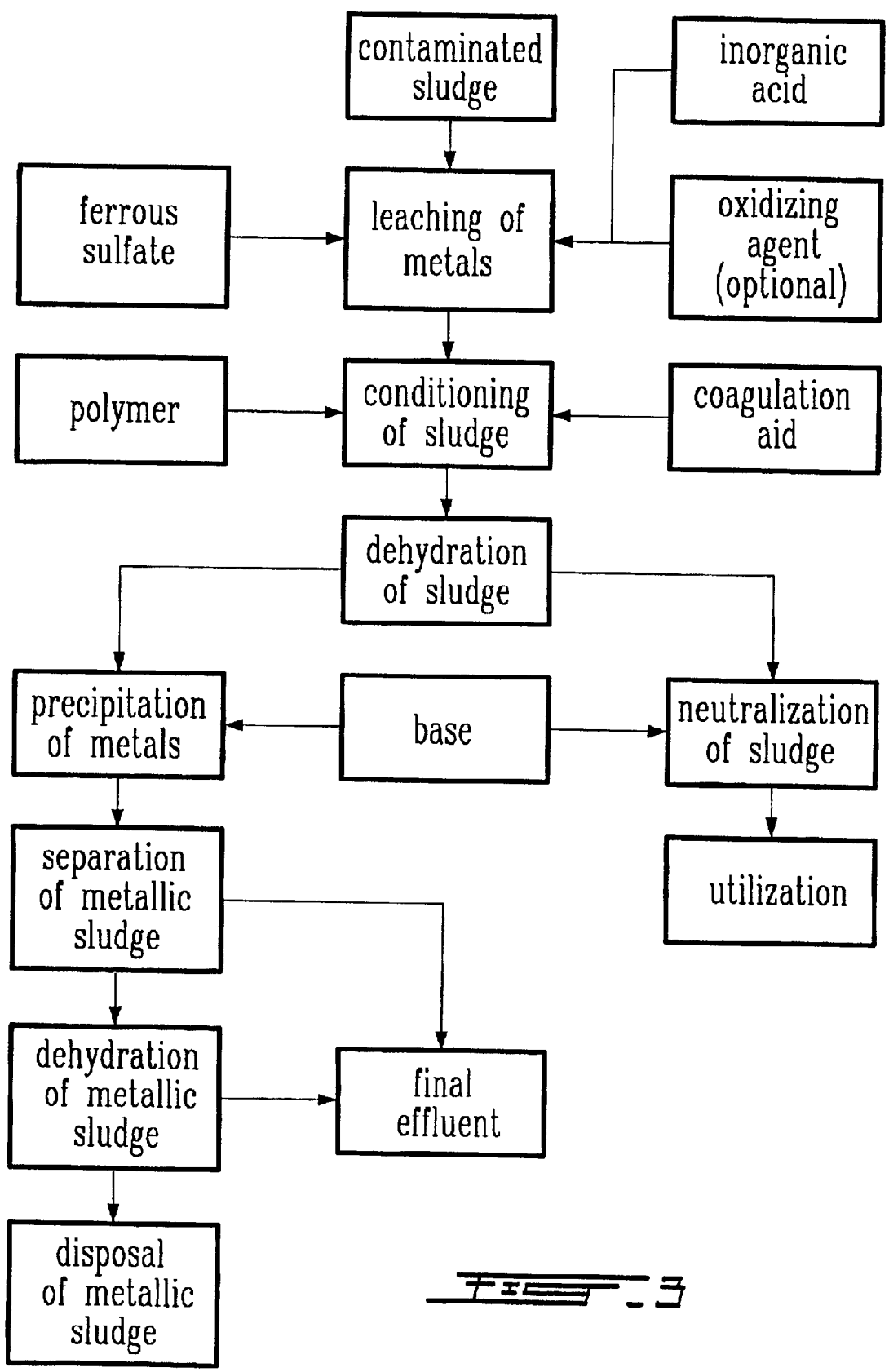

FIG. 1 illustrates a decontamination line according to an embodiment of the invention, in which the leaching solution is added directly to the sludge;

FIG. 2 illustrates a decontamination line according to a second embodiment of the invention, in which the leaching ferric sulfate solution is produced externally, followed by the addition of sulfuric acid and an oxidizing agent; and FIG. 3 illustrates a decontamination line according to a third embodiment of the invention, in which the production of ferric sulfate occurs directly in the sludge, following the addition of the oxidizing agent.

DETAILED DESCRIPTION OF THE INVENTION

The process of the present invention represents an important evolution in comparison to current processes, since it permits taking advantage of biological processes, such as the low cost of chemicals, and of chemical processes, such as low investment attributable to a short treatment time, stability of the reactions, better control of the intrants, a resistance to variations of the operating conditions of the process, such as temperature, presence of aggressive chemical reagents, ionic strength, etc. Moreover, the present process can compete advantageously with the present sludge treatment lines, which permit only relative microbiological stabilization of the sludge, without permitting extraction of the toxic metals. The fact that the process can preserve the fertilizing properties of the sludge due to the presence of carbon, nitrogen and phosphorus, leaving these almost intact, while destroying the pathogenic organisms, and substantially reducing bothersome odors generated during the treatment and handling of the sludge, is even more advantageous. Finally, with regard to the method of producing flocks in the solid/liquid separation step, permitting utilization of conventional dehydration equipment and short residence time in the reactor, the process can be used with slight modifications and inexpensively on practically any sludge treatment line presently in operation in water-treatment plants, thus making its implementation and operation simple, inexpensive and rapid. The process is also applicable to any type of sludge of urban or industrial origin.

Decontamination and Stabilization of Sludge

The leaching of the metals can be accomplished according to three variations which are different from one another.

In a first variant as illustrated in FIG. 1, the leaching is accomplished by direct addition of a leaching solution to the sludge, the leaching solution comprising an inorganic acid, preferably sulfuric acid or hydrochloric acid, and at least one oxidizing agent, preferably ferric chloride, ferric sulfate, hydrogen peroxide, ozone, potassium permanganate, etc. The sludge must be maintained at a pH preferably between 2.0 and 3.0 by the addition of acid, but must not descend below the value of 2, since this would result in undesirable dissolution or degradation of the fertilizing elements contained in the sludge. The oxidizing agent is added as needed to keep the sludge at an oxidation reduction potential (ORP) higher than 400 V. The oxidizing agent permits, on the one hand, acceleration of the dissolution of the metals by increasing the oxidizing conditions and, on the other hand, significant decrease of the dissolution of nutrient or fertilizing elements, such as phosphorus and nitrogen. Simultaneous addition of the acid and the oxidizing agent also permits a substantial decrease of odors emanating from the sewage sludge, while causing the destruction of pathogenic organisms (bacterial indicators). A hydraulic retention time between 0.5 and 6 hours is preferable for dissolution of the metals and stabilization of the biomass.

In a second variant as illustrated in FIG. 2, where the oxidizing agent is ferric sulfate, the dissolution of metals present in the sludge is carried out by the addition of a leaching solution containing the oxidizing agent and acid, the leaching solution being produced in the bioreactor by biological oxidation of ferrous iron to ferric iron. This leaching solution also permits lowering of the pH and an increase in the oxidation reduction potential of the sludge under conditions which are propitious for dissolving the toxic metals. Sulfuric acid and another oxidizing agent, such as hydrogen peroxide, can be added directly to the sludge with the leaching solution produced in the bioreactor to adjust the dissolution conditions of the metals and to aid reduction of the evolution of odors. Again, the pH of the sludge is preferably maintained between 2.0 and 3.0, but should not at any time go below a value of 2.0, while the oxidation reduction potential preferably remains higher than 400 mV. A hydraulic retention time between 0.5 and 6 hours is preferable in this step.

Finally, in a third variant as illustrated in FIG. 3, the step of dissolving the metals can also be achieved by producing the oxidizing agent, in the present case, ferric sulfate, directly in the sludge. In this case, the oxidation of iron ($FeSO_4$, $7H_2O$) added to the sludge is carried out by the indigenous bacterial flora, which includes, for example, *Thiobacillus ferrooxidans*, capable of oxidizing ferrous ion into ferric ion. The same pH conditions as in the two other variants mentioned above should prevail. The reaction time in the bioreactor is between 1 and 2 days, depending on the mode of operation and the specific sludge to be treated. The oxidation of iron can also be accelerated by the addition of a culture of *Thiobacillus ferrooxidans*, or of other microorganisms that can oxidize ferrous ion, added directly to the sludge, in order to reduce the residence time of the sludge in the bioreactor and to promote the stability of the system. The hydraulic retention time of the sludge should be adjusted so as to maintain an ORP higher than 400 mV in the sludge. For a semicontinuous or continuous operation, an oxidizing agent such as hydrogen peroxide or even a nitrate salt can be added in a subsequent step at a concentration sufficient to reduce the residual odors in an adjacent reactor. In the batch method, addition of peroxide can be done at the end of the treatment period in the bioreactor.

The different variants of the metal dissolution step described above can be executed in a batch operation, semicontinuously or continuously. The preferred type of reactor used for this step is a tank agitated mechanically or aerated, although other reactor configurations can also be employed. A sludge solid content between 30 and 40 g/L represents the optimum range of operation for this technology. However, any person skilled in the art can adapt the said content according to the treatment capacity of the station's equipment.

Production of a Leaching Solution

The leaching solution mentioned above consists preferably of a very concentrated solution of ferric sulfate in a strongly acidic medium, i.e., with a pH preferably between 1.0 and 2.5. This solution is generated by biological oxidation of ferrous sulfate and can be performed by a batch method, semicontinuously and continuously in an agitated and aerated tank-type reactor. Other types of reactors can be used in order to increase the kinetics of oxidation of ferrous sulfate, namely, the use of bioreactors with immobilized cells, such as rotating biological disks with a PVC support, or percolation columns with a polyurethane foam support, ion-exchange resins, glass beads or activated carbon particles.

The pH of the reaction should be adjusted so as to permit an adequate kinetics of oxidation of ferrous iron and to avoid precipitation of the ferric iron produced. Although a pH between 1.0 and 2.5 permits the production of ferric iron, it is preferable to maintain the pH below a value of 1.8 in order to reduce the significant precipitation of iron in the bioreactor or even eliminate it. The pH maintained in the reactor can also be adjusted so that the leaching solution produced is sufficient by itself to reduce the pH of the sludge to the desired level, i.e., higher than 2.0 and preferably between 2.0 and 3.0, without having to add additional sulfuric acid or any other acid mentioned above.

The concentration of the substrate, i.e., the ferrous sulfate, should be as high as possible in order to reduce the quantity of the leaching solution to be added to the sludge to a minimum and thus to reduce to a minimum the dimension of the bioreactor required for the oxidation of iron. Substrate contents between 10 and 30 g of $Fe^{2+}$/L are preferable for the step of producing the leaching solution.

It is also suggested to operate the iron oxidation bioreactor with a hydraulic retention time of preferably between 12 and 36 hours. Using a bioreactor with immobilized cells, a shorter retention time, that is, of the order of 6 to 18 hours, is generally sufficient. The hydraulic retention time (HRT) and the substrate concentration used are the two important parameters for dimensioning the bioreactor. For example, considering a basin for leaching metals from sludge with a volume of 25 $m^3$ that can treat 10 tons of sludge on a dry basis per day (solid content 30 kg/$m^3$, HRT of 1.5 hours and a safety factor of 20%), the iron oxidation bioreactor would have a dimension equal to 24 $m^3$ for a hydraulic retention time of 24 hours (yield of oxidation of iron 90%, substrate concentration 15 g of $Fe^{2+}$/L, final content of ferric iron 0.8 g/L in the sludge treatment basin, safety factor 20%).

The iron oxidation bioreactor can be maintained at ambient temperature. The rate of aeration of the bioreactor is preferably adjusted so as to maintain a dissolved oxygen concentration higher than 1 mg/L. The bacterial cultures which oxidize the ferrous ion can be prepared from the indigenous biomass of the sludge or from collection strains previously added to the mixture.

No nutrient element supply is needed for the proliferation of *Thiobacillus ferrooxidans*, since the sludge contains all the nutrient elements necessary for this purpose. The proportion of the final dehydration filtrate employed for the operation of the iron oxidation bioreactor should be of the order of 5 to 10%.

Conditioning and Dehydration of the Sludge

After treatment of the sludge in the reactor, the sludge is conditioned by the addition of a commercial flocculant such as a cationic or anionic organic polymer. These flocculants are well known to the person skilled in the art. However, the addition of a coagulation aid permits considerable improvement in the quality of flocculation of the sludge in certain cases. Examples of preferred coagulants which were tested with success under these conditions are clays, bentonite or ferrocyanide salts, such as sodium or potassium ferrocyanide.

The sludge is then dehydrated on a rotary disk filter unit. Other methods of mechanical dehydration, such as pressurized belt filters, centrifuges or rotary presses may also be employed.

Finally, the dehydrated sludge is neutralized to near the point of neutrality (pH ≃7) or, for certain special applications, to a higher pH, by the addition of a base, such as quicklime (CaO), slaked lime (Ca(OH)$_2$), agricultural lime (CaCO$_3$) or dolomitic lime (mixture of CaO—MgO), and are then transported by truck to the spreading area. Complementary drying methods and granulation of the sludge, composting or formulation and agglomeration involving the addition of chemical products or organic fertilizer to the sludge with agglomeration for specific fertilization applications, may also be applied to the decontaminated sludge before utilization, either in agriculture, silviculture, horticulture, inside a greenhouse or without a greenhouse, for vegetables or fruits, rehabilitation of the soil, or laying and maintenance of lawns. The decontaminated sludge can also be mixed with other materials of organic origin, such as peat, compost, manure, etc., before being utilized.

Neutralization of the Leach and Recovery of Metals

The acid leach containing the metals is neutralized to a basic pH, preferably between 7 and 10, by the addition of a solution of a basic compound such as saturated lime, sodium hydroxide, calcium carbonate, sodium bicarbonate, ammonium hydroxide and magnesium hydroxide. Mixtures of bases may also be used, as well as certain precipitating agents, such as trimercapto-s-triazine. The leach is subsequently allowed to settle until a metallic sludge is obtained. Optional addition of a polyelectrolyte permits in certain cases to increase the yield of the precipitation of metals. This latter residue is initially dehydrated on a filter press unit, then dried in air or in a dryer before being shipped to the disposal site of hazardous waste. Other methods of mechanical dehydration may also be used, including pressurized filter belts, centrifuges and rotary presses.

It is also possible to carry out the precipitation of metals in several steps so as to produce one or several residues characterized as nonhazardous wastes and one or several of residues classified as hazardous wastes. This selective precipitation is carried out by neutralization of the leach in several steps according to procedures well known to the person skilled in the art, each of these precipitation steps being followed by a solid-liquid separation.

Moreover, in certain cases, it may prove to be of greater interest not to recover the metals by neutralization and precipitation, but rather to recycle the acidic or partially neutralized leach into the production or treatment line of the plant.

Another possibility consists of recovering the dissolved metals by adsorption on ion-exchange resin. Various techniques, well known to the person skilled in the art, are used for this purpose.

The process of the present invention permits efficient removal of the heavy metals. As a matter of fact, yields of removal of copper and zinc between 70 and 90% were observed, while for manganese, a percentage of extraction between 75 and 95% is easily achieved. The other heavy metals, such as cadmium and nickel, are also dissolved when they are present in the sludge. The process can also be operated adequately under various climatic conditions encountered in North America or in Europe.

The performance of destruction of the bacterial and viral indicators achieved by the process is clearly superior to those achieved with the conventional processes of aerobic and anaerobic digestion. Moreover, the present process involves significant reduction of the production of unpleasant odors in the sludges produced in comparison to the crude sludges.

Chemical characterization of the sludge treated by the present decontamination process indicates that the decontaminated sludges have a fertilizing value comparable to the sludges digested by the conventional aerobic method. Moreover, decontamination according to the process of the invention leads to an appreciable enrichment of the sludge in iron and sulfur. Greenhouse studies on barley with sludges decontaminated by the process of the invention, using ferrous sulfate as oxidizing agent, showed that the sludges retain a good fertilizing value and that they do not cause any environmental or agronomic problems. In fact, these studies indicated that the potential of utilization of sludges thus decontaminated will prove to be greater than that of the majority of the conventional sludges. Similarly, agricultural spreading of decontaminated sludge could be of particular interest regarding the nutrient needs for sulfur in vegetable cultures. It should also be noted on this subject that an appreciable portion of agricultural soils found all over the world are deficient in sulfur.

The process of the present invention can be carried out and integrated permanently into the treatment lines of waste water or sludge or installed on mobile platforms for occasional treatment of sewage sludge. Methods of additional utilization, such as advanced dehydration, thermal drying in the cold or in the open air, enrichment by addition of potassium, dolomite or other organic or inorganic fertilizers, mixing with other biomasses, etc., may be added downstream to the dehydration step of the sludge in the complete decontamination line.

The following examples are provided to illustrate certain preferred embodiments of the present invention and should not be considered as limiting its scope.

EXAMPLE 1

The process of the present invention was tested for the treatment of physicochemical sludge generated during the treatment of municipal waste water with the aid of ferric chloride. A total of 47 tests were carried out in a batch-type operation. A volume of 143 m$^3$ of sludge having a total mean solid content of 29.3 g/L was treated using a leaching step by direct addition of sulfuric acid and hydrogen peroxide as oxidizing agent to the sludge. Values of pH varying between 2.0 and 2.6 were employed, while the oxidation reduction potential was adjusted to between 400 and 500 mV during these tests, with the leaching time varying between 1 and 4 hours.

The results show that it is possible to reduce the toxic metal content in sludges so as to conform to the criteria for the utilization of this biomass. The mean content of the following elements per kg of dehydrated and decontaminated sludge was obtained for all sludges generated during the tests:

| Cd | 5.83 ± 2.93 mg/kg | Cr | 127 ± 36 mg/kg |
|----|-------------------|----|----------------|
| Cu | 273 ± 56 mg/kg | Ni | 29.5 ± 9.7 mg/kg |
| Pb | 98.6 ± 20.4 mg/kg | Zn | 285 ± 115 mg/kg |

It is important to underline that such physicochemical sludges are generally difficult to decontaminate since the yields of extraction or dissolution of the metals are generally lower than those obtained on biological sludges of municipal treatment stations. The following yields of dissolution of metals were reached based on metal concentrations in solution measured in the dehydration filtrates of the decontaminated sludges:

| Al | 45.9 ± 7.8% | Cd | 57.1 ± 12.8% |
|----|-------------|-----|--------------|
| Cr | 35.7 ± 23.9% | Cu | 50.0 ± 10.9% |
| Fe | 19.1 ± 12.1% | Ni | 58.7 ± 32.0% |
| Zn | 70.4 ± 16.1% | | |

Measurements of ammonium ($NH_4$) show that the application of conditions according to the process of the present invention have little effect on the concentration of ammoniacal nitrogen in solution during the treatment. In fact, the mean concentration of soluble $NH_4$ measured in the leached sludge is less than that obtained for the initial sludge (147±74 mg/L) versus (268±125 mg/L). On the other hand, measurements of the total nitrogen content in the sludge show that the leached and dehydrated sludges contain as much total nitrogen (2.97±0.54% w/w) as the untreated sludges (2.26±0.78% w/w).

Measurements of the total phosphorus in the sludges decontaminated and dehydrated according to the process of the invention indicate that this element remains in the sludge almost totally. Thus, the respective mean values of 1.63±0.27% (w/w) and 1.72±0.27% (w/w) were found in the initial sludge and the decontaminated sludge, respectively, for all the pilot tests. Measurements of soluble phosphorus also show that the treatment of sludge according to the process of the invention does not result in loss of soluble phosphorus. As a matter of fact, the mean concentration of soluble phosphorus measured in the leached sludges is 15.1±7.2 mg/L, while it is only 1.44±2.63 mg/L for the initial sludges.

Measurements of dissolved organic carbon (DOC) show moreover that very little organic material goes into solution during the treatment. The mean concentration of DOC measured in the leached sludges is 981±336 mg/L, while it is 1310±399 mg/L for the untreated sludges. Similarly, application of the process does not contribute to significant modification of the total carbon content in the sludge. Thus, a mean total carbon content of 27.5±8.5% (w/w) was found for the untreated sludges, while a mean content of 33.3±4.3% (w/w) was established for the decontaminated and dehydrated sludges.

The technique used for quantifying the decrease of odors after application of the process consists in measuring the flux of odor emitted by the sludge. The flux of odor is defined as the flow rate of odor per unit surface. Samples of odor flux were taken with the aid of a flux chamber Odoflux™. This flux chamber permits quantification of the odor flux generated at the surface of the sludge. Thus, it becomes possible to compare with precision and repetitively the surface emission from different types of sludges on the same basis. A volume of approximately 70 liters of sludge was used for sampling. The sludge was deposited in a plastic reservoir of 76 cm in diameter, with a sludge thickness of 10 cm. Then the flux chamber was deposited on the sludge and inserted at a depth of 5 cm. The odor samples were stored in Tedlar™ bags to be transported to the laboratory. The samples taken were analyzed in order to obtain olfactometric measurements by dynamic dilution to the threshold of olfactory perception according to the standard ASTM E679-91. The threshold of perception is defined as being the rate of dilution with pure air for which 50% of a panel, asked to smell it, perceive or do not perceive the odor. By definition, the threshold of olfactory perception is equivalent to 1 o.u./$m^3$. The number of dilutions of the odorous mixture necessary in order to obtain 1 o.u./$m^3$ indicates the concentration of "odor" in odor units per cubic meter of air (o.u./$m^3$). The results show an appreciable suppression of odors for the dehydrated and decontaminated sludges in comparison to the sludges that were not decontaminated (>97%). Similarly, a high yield of elimination of odors was obtained for the liquid leached sludges (>93%), in comparison to liquid untreated sludges taken from a mixing basin.

Three methods of mechanical dehydration of the leached sludges were tested, using a rotary disk filter, a rotary press or a centrifuge. According to the tests, the conditioning of the sludge was carried out by the addition of a cationic polymer or an anionic polymer (1 to 5 kg/tons of sludge on dry basis). During the dehydration tests on the filter press, the cake dryness achieved was between 18 and 31% of the total solid, while a mean capture rate of the suspended matter of 97±2% was measured. With the rotary press, the dryness fluctuated between 15 and 53% with a mean rate of capture of the suspended matter of 93±2%. Finally, the use of a centrifuge permitted achievement of dryness values between 20 and 31% with a mean capture of the suspended matter of 92±2%.

EXAMPLE 2

The process of decontamination and stabilization was tested for the treatment of biological sludges coming from municipal waste water treatment. During these studies, a total of 4 tests were completed in a batch-type operation. A volume of 16 $m^3$ of sludge having a total mean solid content of 20.5 g/L was treated using a leaching step by direct addition of sulfuric acid and ferric chloride as oxidizing agent to the sludge. Values of pH varying between 2.0 and 2.5 were used, while the oxidation reduction potential was adjusted to between 400 and 490 mV during the test with the leaching time being between 1 and 4 hours.

For these tests, the following yields of dissolutions of metals were achieved, based on the concentration of metal in solution, measured in the dehydration filtrate of the decontaminated sludge.

| Cd | 90.8 ± 11.4% | Cr | 63.0 ± 2.4% |
|----|--------------|-----|-------------|
| Ni | 84.0 ± 11.7% | Pb | 30.5 ± 7.6% |
| Zn | 91.8 ± 4.5% | | |

Measurement of the reduction of the concentrations of total coliforms, of fecal coliforms and fecal streptococci was carried out in the sludge after 1 hour of treatment under the leaching conditions described above. The results showed a mean decrease of total coliforms of 4.90±0.93 logarithmic units or 99.9987%. Regarding fecal coliforms, a mean reduction of 4.80±0.88 logarithmic units was obtained, or 99.9984%. With regard to fecal streptococci, a mean removal of 2.14±024 logarithmic units was found, equivalent to 99.28%. In the majority of cases, the concentrations of the bacterial indicators were lowered below the detection threshold of 10 CFU/mL.

Although the present invention was described with the aid of specific embodiments, it is understood that several variations and modifications may be included in the said embodiments, and the present application aims to cover such modifications, usages or adaptations of the present invention, following in general the principles of the invention and including any variation of the present description, which will become known or conventional in the field of activity in which the present invention lies and which may apply to the essential elements mentioned above in agreement with the scope of the following claims.

What is claimed is:

1. Hybrid chemical and biological process for decontamination of sewage sludge containing heavy metals and pathogenic microorganisms, comprising the following steps:
   a) treating the sludge with an acidic leaching solution to acidify the sludge to a pH between 2.0 and 3.0 so as to dissolve the majority of the heavy metals and to destroy the majority of the pathogenic microorganisms, the leaching solution containing an oxidizing agent in a quantity sufficient to maintain an oxidation reduction potential higher than +400 mV;
   b) flocculating the sludge treated in step (a)
   c) effecting a solid-liquid separation to provide a solid fraction comprising decontaminated and dehydrated acid sludge and a liquid fraction containing the heavy metals;
   d) neutralizing the decontaminated acid sludge; and
   e) recovering the decontaminated and neutralized sludge, the recovered sludge having a fertilizing element content which is defined as $N_{total}$ and $P_{total}$ and which is not reduced in comparison to the initial contaminated sludge.

2. Process according to claim 1, wherein the leaching solution contains an inorganic acid selected from the group consisting of sulfuric acid, hydrochloric acid and mixtures thereof.

3. Process according to claim 1, wherein the oxidizing agent is selected from the group consisting of ferric chloride, ferric sulfate, hydrogen peroxide, ozone, potassium permanganate and mixtures thereof.

4. Process according to claim 1, wherein a second oxidizing agent is added to the leaching solution in step (a).

5. Process according to claim 4, wherein the second oxidizing agent is selected from the group consisting of ferric chloride, ferric sulfate, hydrogen peroxide, ozone potassium permanganate and mixtures thereof.

6. Process according to claim 1, wherein a coagulation aid is added to the sludge, in step (b).

7. Process according to claim 6, wherein the coagulation aid is a ferrocyanide salt or clay.

8. Process according to claim 1, wherein the steps are carried out in a batch method, semicontinuous method or continuous method.

9. Process according to claim 1, wherein step (d) is carried out with a solution containing a base selected from the group consisting of calcium hydroxide, sodium hydroxide, calcium carbonate, ammonium hydroxide, magnesium hydroxide and mixtures thereof, followed by decantation.

10. Process according to claim 1, wherein the leaching solution contains a ferric iron salt, a ferrous iron salt or a mixture thereof, combined with sulfuric acid.

11. Process according to claim 10, wherein the ferric iron salt is a sulfate or a chloride produced by biological oxidation of ferrous sulfate or ferrous chloride.

12. Process according to claim 11, wherein the biological oxidation is carried out with the aid of a culture of *Thiobacillus ferrooxidans* obtained from the indigenous biomass of the sludge or from collection strains.

13. Process according to claim 12, wherein the leaching solution is replaced by the direct addition of an acid and of a ferrous sulfate solution to the sludge, the ferrous sulfate being oxidized by the indigenous bacterial flora to produce ferric sulfate which acts as an in situ oxidizing agent.

14. Process according to claim 13, wherein the acid is selected from the group consisting of sulfuric acid, hydrochloric acid and mixtures thereof.

15. Process according to claim 14, wherein step (a) is carried out with a hydraulic retention time between 0.5 and 6 hours.

16. A hybrid chemical and biological process for decontamination of sewage sludge containing heavy metals and pathogenic microorganisms, consisting essentially of:
   a) mixing the sludge with an acidic leaching solution to acidify the sludge to a pH sufficiently low to dissolve the majority of the heavy metals and to destroy the majority of the pathogenic microorganisms;
   b) maintaining an oxidation reduction potential higher than +400 mV;
   c) effecting a solid-liquid separation to provide a solid fraction comprising decontaminated acid sludge and a liquid fraction containing the heavy metals dissolved in the leaching solution;
   d) neutralizing the sludge; and
   e) recovering the decontaminated neutralized sludge, the recovered sludge having a fertilizing element content which is defined as $N_{total}$ and $P_{total}$ and which is not reduced in comparison to the initial contaminated sludge.

17. A hybrid chemical and biological process for decontaminating sewage sludge containing heavy metals and pathogenic microorganisms, comprising:
   a) treating the sludge, in a reactor, with an acidic leaching solution to acidify the sludge to a pH between 2.0 and 3.0 so as to dissolve the majority of the heavy metals and to destroy the majority of the pathogenic microorganisms, without dissolving significant quantities of carbon, the leaching solution containing an oxidizing agent in a quantity sufficient to maintain an oxidation reduction potential higher than +400 mV, without aerating the sludge;
   b) maintaining the reactor at ambient temperature during step (a);
   c) flocculating the sludge treated in step (a);
   d) effecting a solid-liquid separation to provide a solid fraction comprising decontaminated and dehydrated acid sludge, and a liquid fraction containing the heavy metals;
   e) neutralizing the decontaminated acid sludge, and
   f) recovering the decontaminated and neutralized sludge, the recovered sludge having a fertilizing element content which is defined as $N_{total}$ and $P_{total}$ and which is not reduced in comparison to the initial contaminated sludge.

18. A hybrid chemical and biological process for decontaminating sewage sludge containing heavy metals and pathogenic microorganisms, comprising:
   a) treating the sludge with an acidic leaching solution to acidify the sludge to a pH between 2.0 and 3.0 so as to dissolve the majority of the heavy metals and to destroy the majority of the pathogenic microorganisms, without dissolving significant quantities of carbon, the leaching solution containing an oxidizing agent in a quantity sufficient to maintain an oxidation reduction potential higher than +400 mV, without aerating or heating the sludge;
   b) flocculating the sludge treated in step (a);
   c) effecting a solid-liquid separation to provide a solid fraction comprising decontaminated and dehydrated acid sludge, and a liquid fraction containing the heavy metals;
   d) neutralizing the decontaminated acid sludge, and
   e) recovering the decontaminated and neutralized sludge, the recovered sludge having a fertilizing element content which is defined as $N_{total}$ and $P_{total}$ and which is not reduced in comparison to the initial contaminated sludge.

* * * * *